July 29, 1941.   G. SEEFELD   2,250,969
CURRENT RESPONSIVE INSTRUMENT
Filed Feb. 25, 1937

Inventor:
Georg Seefeld,
by Harry E. Dunham
His Attorney.

Patented July 29, 1941

2,250,969

UNITED STATES PATENT OFFICE 2,250,969

CURRENT RESPONSIVE INSTRUMENT

Georg Seefeld, Berlin-Lichtenberg, Germany, assignor to General Electric Company, a corporation of New York Application February 25, 1937, Serial No. 127,744
In Germany March 14, 1936

5 Claims. (Cl. 177—337)

My invention relates to telemetric and signal-transmission systems and current-responsive instruments or receivers which are particularly useful for such systems.

It is an object of my invention to provide a receiver for telemetric or signal-transmitting systems so constructed as to obviate the necessity for special transmission circuits or arrangements, and particularly to avoid the necessity for transmitting impulses.

It is an object of my invention to provide a telemetering system in which a single conductor cable may be employed for joining transmitting and receiving stations.

It is a further object of my invention to provide a signal-transmitting system and receiver which provides positive indications of a plurality of different signals to be transmitted.

A further object of my invention is to provide such a system and receiver for the transmission of measurements.

Other and further objects and advantages will become apparent as the description proceeds.

In carrying out my invention in its preferred form, I utilize as a receiver for a telemetric system, a current-responsive instrument similar in construction to usual types of current-measuring devices having a stationary magnet and a movable coil with the exception that the pole pieces are provided with salient pole elements. Soft iron inserts or magnetizable pieces may also be carried by the movable coil. If desired, the usual pointer of measuring instruments may be replaced by a disk carrying suitable numbers or other signals cooperating with a face plate having a window adapted to expose one of the numbers according to the angular position of the movable disk.

Figure 1:
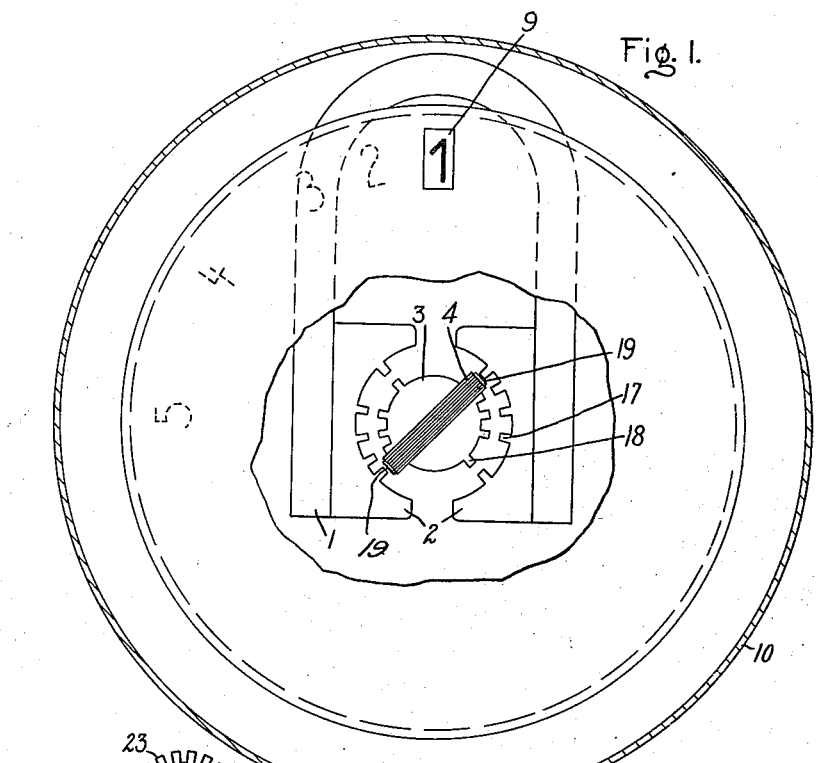
Figure 2:
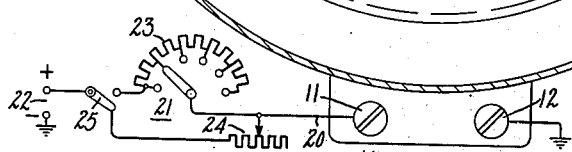
Figure 2:
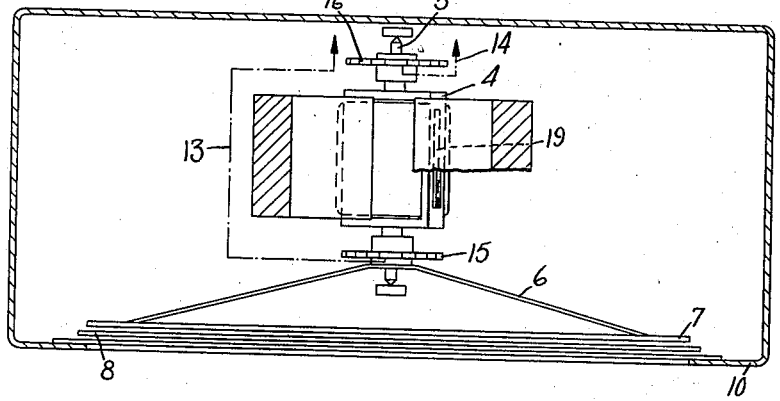
Figure 3:
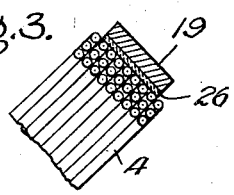

The invention may be understood more readily from the following detailed description when considered in connection with the accompanying drawing and the features of the invention which are believed to be novel and patentable will be pointed out in the claims appended hereto. In the drawing, Fig. 1 is a plan view, partially in section, of a receiver forming an embodiment of my invention connected to a transmission system represented schematically; Fig. 2 is an elevation in section with a part broken away of the apparatus of Fig. 1 and Fig. 3 is a fragmentary cross sectional view of the movable element of the receiver instrument shown in Figures 1 and 2. Like reference characters are utilized throughout the drawing to designate like parts.

Referring now more in detail to the drawing, the current-responsive instrument forming the receiver for the measurements or signals to be transmitted comprises a stationary field member and a rotatable element enclosed in a suitable casing. The stationary field member is a flux carrying member which comprises a horseshoe permanent magnet 1 having soft iron pole pieces 2 and a core 3 between the pole pieces 2 spaced therefrom to form an air gap through which the movable member may travel. The movable member consists of a current-conducting coil 4 supported by a rotatable shaft 5 carrying struts 6 on which is mounted a rotatable disk 7 cooperating with a stationary disk or face plate 8 having a window 9 therein adapted to expose numbers, signs, or other indicia marked at suitable angular positions on the rotatable disk 7. The entire assembly is mounted within the casing 10 to which is attached a terminal block carrying the binding posts 11 and 12. The binding posts 11 and 12 are connected by suitable leads 13 and 14 and bronze spiral springs 15 and 16 to the conductor ends of the coil 4.

It will be observed that the pole pieces 2 and core 3 differ from those of the usual d'Arsonval instrument in having salient pole elements 17 and 18, respectively. For the purpose of compressing the magnetic field acting upon the coil 4, the coil preferably carries magnetic pieces or inserts 19 secured to the coil by cement 26 and composed of soft iron or other magnetically permeable material. The magnetic pieces 19 are carried by the coil 4 in the air gap between the pole pieces 2 and the core 3. It will be observed from the drawing that the angular width of the magnetic pieces does not exceed the minimum angular spacing between the salient pole elements 17 or 18. Although the coil may be relatively wide when the magnetic pieces are employed, it will be apparent from the explanation of the operation heretofore given that without the magnetic pieces 19 it would be preferable to have the coil 4 relatively narrow in angular width in relation to the angular width and spacing of the salient pole elements 17 or 18.

A single conductor 20 suffices for joining the receiver mounted in the casing 10 to the transmitting station represented at 21. One of the terminals 11 is connected to the conductor 20 and the other terminal 12 is grounded. The transmitting station 21 includes a source of current 22 grounded at one side and a suitable device either for producing stepwise or smoothly continuous variations in current. Such devices are represented schematically by the multitap rheostat 23 and the slide-wire rheostat 24, respectively. For the sake of facilitating the explanation, a double-throw switch 25 is shown for connecting one or the other of the devices 23 and 24 to the current source 22 in series with the conductor 20, since obviously only one such device is intended to be used at the same time.

It will be apparent that the salient pole elements 17 and 18 tend to distribute the magnetic flux in parallel paths through the respective pole elements. The magnetizable pieces 19 tend to concentrate the magnetic flux through the path intersecting the conductors of the coil 4 in whatever position it happens to be. In consequence, variations in current supplied to the coil 4 produce stepwise rotation of the coil, that is, motion in jerks or jumps instead of steady motion as in the case of ordinary indicating instruments. This peculiar motion may be characterized as desultory or step-wise motion and results in the rotatable disk 7 taking up very definite positions corresponding to different current ranges so that definite signals are provided by the appearance of the numbers or signs behind the window 9. In view of this characteristic, it is immaterial whether the current supplied by the transmitter varies smoothly or varies in a desultory manner corresponding to the positions of the rotatable disk 7. In case the current is varied smoothly, the coil 4, nevertheless, remains in the position near one of the salient pole elements until the current has changed sufficiently to cause the coil to deflect from one position to the next. It will be understood, of course, that the springs 15, 16 serve as biasing springs as well as current lead spirals so that a balance takes place at all times between the biasing torque and the torque produced by the magnetic reaction. The magnetizable pieces 19 provide a low reluctance path for the flux passing between the nearest salient pole element of the pole pieces 2 and the core. Consequently the paths of the flux lines are such as to give rise to forces which tend to maintain the magnetizable pieces 19 in the movable element 14 substantially opposite the nearest salient pole element, and the movable element does not jump out of this position until the change in current strength is sufficient to pull the movable element to the position of the next salient pole element.

Preferably the salient pole elements 18 and 19 are spaced to correspond to logarithmic increments of current. The instrument may be so designed that current variations within twenty per cent, for example, will not produce any change in indication but greater current variations will cause the movable element to deflect one position by making the normal currents corresponding to the various positions increase by successive increments of fifty per cent. For example, if the normal current which corresponds to the disk position shown in the drawing is 12 milliamperes and that corresponding to the next position is 18 milliamperes, an increase of twenty per cent in the current from 12 milliamperes would result in a current of 14.4 milliamperes, which would be insufficient to overcome the flux concentrated through the magnetic insert 19 and the salient pole elements. On the other hand, a greater current would cause the coil to spring to the next position. Likewise, in the next position, if the current should decrease twenty per cent from 18 milliamperes to 14.4 milliamperes, the coil position would be unaffected but greater decrease in current would permit the biasing springs to reduce the deflection of the coil. It will be understood that the air gaps at the salient pole portions are made of such lengths that the holding force is overcome by the turning force at the current-increment limits mentioned. In the example shown, the respective current ranges exactly meet although it will be understood that even greater definiteness of indication might be obtained by leaving gaps between the current ranges corresponding to successive indicating positions of the disk 7.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A current-responsive instrument comprising in combination, a pair of relatively movable members comprising a field element and a current-conducting coil, respectively, and resilient means biasing the movable members to a predetermined relative position, said field element including a magnet having pole pieces with salient pole elements and a core between said pole pieces with salient pole elements corresponding to the salient pole elements of the pole pieces with air gaps therebetween, said current-conducting coil being mounted within said air gaps and the member comprising said current-conducting coil including also suitable indicia for indicating the relative position of said members, and said current-conducting coil carrying pieces of magnetically permeable material, said salient pole elements being spaced on said pole pieces and said core at the intervals of logarithmic variation in force between said relatively movable members for relative motion of said members, said magnetically permeable pieces being secured to the portions of said coils in the air gap and not exceeding in angular width the minimum angular spacing between said salient pole elements.

2. A current-responsive instrument comprising in combination, a pair of relatively rotatable members carrying suitable indicia for indicating successive definite relative angular positions of said members, said members comprising a field member and a current-carrying member, said field member comprising a magnet and a pair of pole pieces with salient pole elements angularly spaced thereon, said current-carrying member comprising a current-conducting coil positioned between said pole pieces and carrying magnetizable pieces, the angular spacing of said salient pole elements being such that each angular position exceeds the previous angular position by a predetermined fraction of the total angle of the previous position, said magnetizable pieces not exceeding in angular width the minimum angular spacing between said salient pole elements.

3. A current-responsive instrument comprising in combination, a pair of relatively rotatable members carrying suitable indicia for indicating successive definite relative angular positions of said members, said members comprising a field member and a current-carrying member, said field member comprising a magnet and a pair of pole pieces with salient pole elements angularly spaced thereon, said current-carrying member comprising a current-conducting coil positioned between said pole pieces and carrying magnetizable pieces not exceeding in angular width the minimum angular spacing between said salient pole elements.

4. A current-responsive instrument comprising in combination, a pair of relatively rotatable members, said members comprising a field member and a current-carrying member, said field member comprising a magnet with pole pieces and a core positioned between said pole pieces, said core having salient pole elements angularly spaced thereon, and said current-carrying member comprising a current-conducting coil surrounding said core, the angular width of said coil being small in relation to the angular width and spacing of the said salient pole elements.

5. A current-responsive instrument comprising in combination, a pair of relatively rotatable members, said members comprising a field member and a current-carrying member, said field member comprising a magnet with pole pieces and a core positioned between said pole pieces, said pole pieces and core having confronting pole faces, at least one of said faces having salient pole elements angularly spaced thereon, and said current-carrying member comprising a current-conducting coil surrounding said core and carrying magnetizable pieces not exceeding in angular width the minimum angular spacing between said salient pole elements.

GEORG SEEFELD.